(12) United States Patent
Fischer et al.

(10) Patent No.: US 11,311,903 B2
(45) Date of Patent: Apr. 26, 2022

(54) COATING METHOD AND COATING DEVICE WITH COMPENSATION FOR ASYMMETRIES OF THE SPRAY JET

(75) Inventors: Andreas Fischer, Ludwigsburg (DE); Ralph Glaser, Schomberg (DE); Carmen Goltz, Lochgau (DE)

(73) Assignee: DÜRR SYSTEMS AG, Bietigheim-Bissingen (DE)

( * ) Notice: Subject to any disclaimer, the term of this patent is extended or adjusted under 35 U.S.C. 154(b) by 0 days.

(21) Appl. No.: 14/345,706

(22) PCT Filed: Sep. 5, 2012

(86) PCT No.: PCT/EP2012/003729
§ 371 (c)(1),
(2), (4) Date: Mar. 19, 2014

(87) PCT Pub. No.: WO2013/041184
PCT Pub. Date: Mar. 28, 2013

(65) Prior Publication Data
US 2014/0220231 A1    Aug. 7, 2014

(30) Foreign Application Priority Data
Sep. 23, 2011    (DE) .................. 10 2011 114 382.7

(51) Int. Cl.
*B05D 1/04*       (2006.01)
*B05D 1/02*       (2006.01)
(Continued)

(52) U.S. Cl.
CPC .............. *B05D 1/04* (2013.01); *B05B 12/082* (2013.01); *B05B 12/16* (2018.02);
(Continued)

(58) Field of Classification Search
CPC ......... B05B 15/04; B05B 12/082; B05B 5/04; B05D 1/02; B05D 1/04; G05B 2219/45065
See application file for complete search history.

(56) References Cited

U.S. PATENT DOCUMENTS

| | | | |
|---|---|---|---|
| 3,563,474 A * | 2/1971 | Robinson | B05B 1/02 134/172 |
| 2003/0017276 A1 | 1/2003 | Yamada et al. | |
| 2005/0199603 A1 * | 9/2005 | Vardelle | B23K 10/006 219/130.21 |

FOREIGN PATENT DOCUMENTS

| | | |
|---|---|---|
| DE | 19608754 A1 | 9/1997 |
| DE | 19847258 A1 | 4/2000 |

(Continued)

*Primary Examiner* — Dah-Wei D. Yuan
*Assistant Examiner* — Stephen A Kitt
(74) *Attorney, Agent, or Firm* — Bejin Bieneman PLC (57) ABSTRACT

The invention relates to a coating method for coating a component surface (4) with a coating agent, in particular for painting a motor vehicle body component with a paint, having the following steps: • emitting a spray jet (1) of the coating agent onto the component surface (4) of the component to be coated by means of an atomizer (2), said spray jet (1) having a main axis (5) and having an asymmetry with respect to the main axis (5) such that the spray jet (1) generates a spray pattern with a corresponding asymmetry on the component surface (4), and • at least partially compensating for the asymmetry of the spray jet (1) such that the asymmetry of the resulting spray pattern on the component surface (4) is reduced. The invention further relates to a corresponding coating device.

8 Claims, 7 Drawing Sheets

(51) Int. Cl.
   *B05B 12/08*    (2006.01)
   *B05B 13/04*    (2006.01)
   *B05B 12/16*    (2018.01)
   *B05B 5/04*     (2006.01)

(52) U.S. Cl.
   CPC ............ *B05B 13/0452* (2013.01); *B05D 1/02* (2013.01); *B05B 5/04* (2013.01); *G05B 2219/45065* (2013.01)

(56) References Cited

FOREIGN PATENT DOCUMENTS

| | | | | |
|---|---|---|---|---|
| DE | 60304914 | T2 | 12/2006 | |
| EP | 0695582 | A1 | 2/1996 | |
| EP | 1522347 | A1 | 4/2005 | |
| EP | 2468463 | A2 | 6/2012 | |
| FR | 2894599 | A1 | 6/2007 | |
| FR | 2894599 | A1 * | 6/2007 | ........... B05B 12/082 |
| JP | S59129262 | A | 7/1984 | |
| JP | S61-44258 | U | 3/1986 | |
| JP | H07236841 | A | 9/1995 | |
| JP | H11-57606 | A | 3/1999 | |
| JP | H11276978 | A | 10/1999 | |
| JP | 2002331539 | A | 11/2002 | |
| JP | 2002355582 | A | 12/2002 | |
| JP | 2003019451 | A | 1/2003 | |
| JP | 2004249192 | A | 9/2004 | |
| JP | 2005519193 | A | 6/2005 | |
| JP | 2011104535 | A | 6/2011 | |

* cited by examiner

Compensation
of the stretching

Compensation
of the compression

Fig. 3B

Deformation of the
spray jet $V_{PULL}$

Angulation of the atomizer to
compensate for the deformation
of the spray jet

COATING METHOD AND COATING DEVICE WITH COMPENSATION FOR ASYMMETRIES OF THE SPRAY JET

CROSS-REFERENCE TO RELATED APPLICATIONS

This application is a National Phase of International Application No. PCT/EP2012/003729, filed on Sep. 5, 2012, which claims priority to German Application No. 10 2011 114 382.7, filed on Sep. 23, 2011, which applications are hereby incorporated by reference in their entirety.

A coating method for coating a component surface of a component with a coating agent, in particular for painting a motor vehicle body part with a paint, is disclosed, as is a corresponding coating device.

BACKGROUND

In modern painting installations for the painting of motor vehicle body components, one generally uses as application devices rotary atomizers, which spin off paint to be applied in the form of droplets from a rapidly rotating bell cup, so that an approximately rotationally symmetrical spray jet results. The rotary atomizers can be guided by multi-axis painting robots with serial kinematics, which allows for a high application efficiency.

Figure 1A:
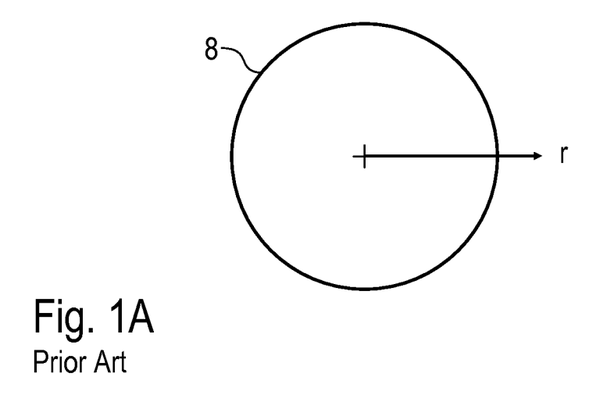
FIG. 1A: a schematic representation of a spray pattern of a rotary atomizer with an idealized, exactly rotationally symmetrical spray jet.
Figure 1B:
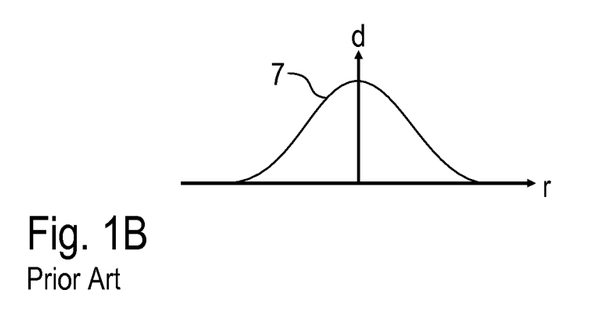
FIG. 1B: the layer thickness distribution for an idealized, exactly rotationally symmetrical spray jet.
Figure 1C:
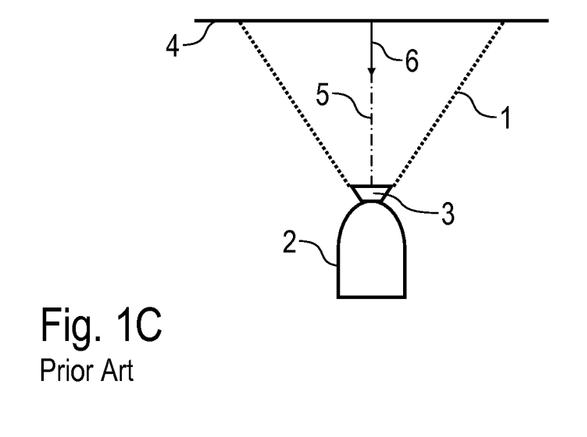
FIG. 1C: a schematic representation of a rotary atomizer with an idealized, exactly rotationally symmetrical spray jet, which is oriented at right angle to a component surface.

For example, FIGS. 1A to 1C show the conventional application of an idealized spray jet 1 by a rotary atomizer 2 with a bell cup 3 onto a component surface 4 of a component to be coated, for example, a motor vehicle body component. It is apparent from FIG. 1C that the rotary atomizer 2 is guided by the painting robot (not shown) over the component surface 4 in such a manner that the spray jet 1 is oriented with its main axis 5 at a right angle to the component surface 5, and thus parallel to a surface normal 6 of the component surface 4. For a curvature of the component surface 4, the rotary atomizer 2 is then respectively oriented in such a manner that the spray jet 1 is oriented with the main axis 5 parallel to the surface normal 6 of the component surface 4 at the point of impact of the spray jet 1. For the idealized, exactly rotationally symmetrical spray jet 1, there is then, without any movement of the rotary atomizer 2, an accordingly symmetrical layer thickness distribution 7, as can be seen in FIG. 1B. The symmetry of the layer thickness distribution 7 is advantageous when the rotary atomizer 2 sequentially applies several painting paths lying laterally side by side and overlapping laterally onto the component surface 4, since the superimposition of the layer thickness distributions 7 of painting paths laying side by side then leads to an approximately uniform layer thickness. FIG. 1A shows for the idealized rotationally symmetrical spray jet 1 a spray pattern 8, which is rotationally symmetrical, wherein the drawing reproduces a boundary line within which the layer thickness d does not fall below a predefined limit value.

Figure 2A:
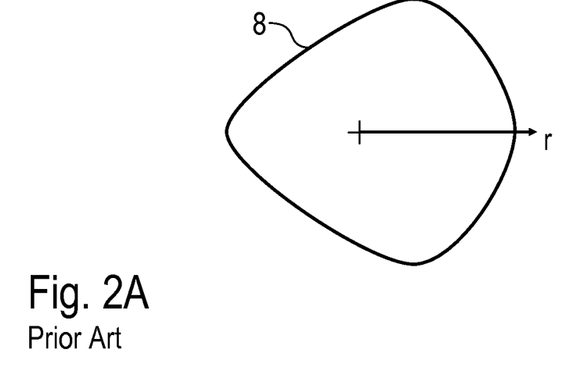
FIG. 2A: a schematic representation of a spray pattern of a rotary atomizer with a real, not exactly rotationally symmetrical spray jet.
Figure 2B:
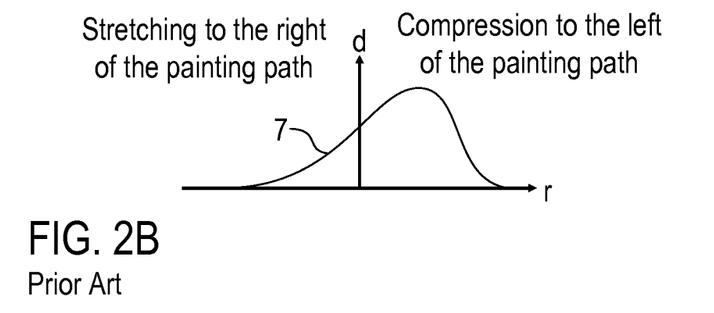
FIG. 2B: the layer thickness distribution for the real, not exactly rotationally symmetrical spray jet.
Figure 2C:
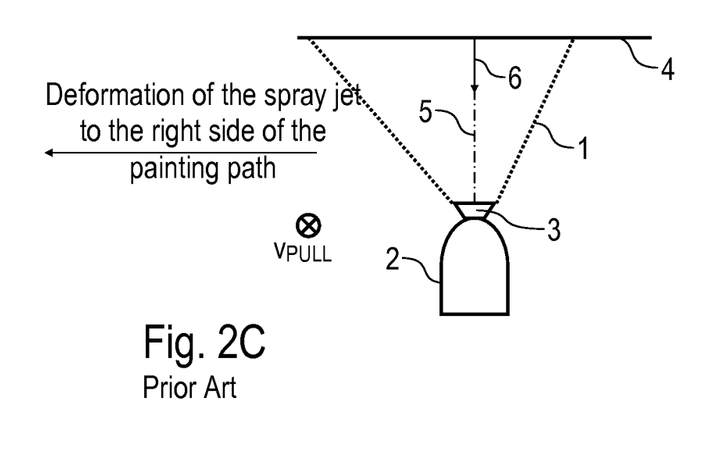
FIG. 2C: the rotary atomizer with the not rotationally symmetrical spray jet, which is oriented at a right angle to the component surface.

In practice, the spray jet 1 is, however, not exactly rotationally symmetrical, but rather is more or less deformed by external forces, as is represented in the FIGS. 2A to 2C. So, for example, the gravitational force, an electrostatic force due to an electrostatic coating agent charging as well as flow forces, which are generated by the movement of the rotary atomizer 2 in the surrounding air, or by a downward oriented air flow in a paint cabin, act on the spray jet 1 as deformation forces. In FIG. 2C, the rotary atomizer 2 is moved by the painting robot with a certain speed $V_{PULL}$ into the drawing plane, wherein the bell cup 3 turns clock-wise, as seen from the rotary atomizer 2. In this case, the spray jet 1 is deflected to the left in FIG. 2C due to the disturbing flow forces (i.e., on the right side of the painting path), so that the layer thickness distribution 7 on the left side in FIG. 2B (i.e., on the right side of the painting path) is stretched in the sideward direction over a larger surface, which leads on the left side in FIG. 2B (i.e. on the right side of the painting path) to a reduced layer thickness. On the right side in FIG. 2B (i.e. on the left side of the painting path), the layer thickness distribution 7 is, in contrast, compressed in the sideward direction to a smaller surface, which leads on the right side to an accordingly larger layer thickness. The asymmetry of the spray jet 1 thus generated leads on the component surface 4 to an accordingly asymmetrical layer thickness distribution 7 and to a likewise accordingly asymmetrical spray pattern 8, as is apparent in the FIGS. 2A and 2B. The resulting painting path has therefore on the left side an increased layer thickness, and on the right side a reduced layer thickness. This asymmetry of the spray jet 1, during application of several painting paths lying side by side and overlapping sidewards, leads to a relatively highly variable layer thickness distribution 9, as is apparent in FIG. 4A, wherein the layer thickness distribution 9 consists of a superimposition of layer thickness distributions 10 of the individual painting paths lying side by side.

The asymmetry of the spray jet 1 and the resulting problems with respect to the irregularity of the layer thickness distribution 9 were, however, have previously been undetected.

Reference is also made to EP 1 522 347 A1 concerning the prior art. This document does, however, not concern the technical field of the painting technology, but rather cooling technology, and is therefore remote from the present disclosure.

SUMMARY

The presently-disclosed subject matter arises from the technical-physical insight that the disturbing irregularity of layer thickness distribution stems from asymmetries of the spray jet of the atomizer. It is disclosed herein to at least partially compensate for the asymmetry of the spray jet, so that the asymmetry of the resulting spray pattern on the component surface is reduced.

The asymmetry of the spray jet may be compensated for by angling the spray jet's main axis with respect to the surface normal of the component surface so that the spray jet hits the component surface with its main axis slanted with respect to, i.e., at a less than 90 degree angle to, the component surface. For example, this can be achieved such that the atomizer is angled with its spraying axis with respect to the surface normal of the component surface so that an accordingly angled spray jet, i.e., slanted with respect to the component surface and at an angle to the surface normal, also results.

Further, in addition or alternatively to angling the atomizer with respect to the agent for compensation of the asymmetry of the spray jet, it also possible, for example, to impinge the spray jet with a suitable guide air stream in order to improve the symmetry of the spray jet and thereby achieve a more uniform layer thickness distribution on the component surface.

Further, it is also possible to have an asymmetrical guide air ring with numerous guide air nozzles, which impinge the spray jet from behind with an asymmetrical guide air stream, wherein the guide air ring is rotatable relative to the spray jet in order to compensate for the asymmetry of the spray jet.

The asymmetry of the guide air ring can, for example, be achieved by additional guide air bores, different borehole sizes of the guide air nozzles, groups of bore holes with separated triggering, or asymmetrical bore holes.

The atomizer may be moved in a certain painting direction along the component surface to apply an elongated painting path along the painting direction onto the component surface. In this case, the spray jet is angled with its main axis preferably transverse to the painting direction to at least partially compensate for the asymmetry of the spray jet. The angle of the spray jet with respect to the surface normal of the component surface is therefore done preferably not in or opposite to the painting direction, but rather transversely with respect to the painting direction, namely preferably at a generally right angle to the painting direction.

In this case, the atomizer must not be angled exactly at right angle to the painting direction in order to compensate for the asymmetry of the spray jet. Instead, there is also the option within the context of invention for intermediate angles or an angulation in different tilt planes.

Further, the direction of angulation depends on the direction of rotation of the bell cup and on the painting direction of the atomizer. If the bell cup—seen from the rotary atomizer, i.e., from behind—turns clock-wise, the atomizer is preferably angled rightwards with respect to the painting direction. If, in contrast, the bell cup—as seen from the rotary atomizer, i.e.s from behind—turns counter-clockwise, the atomizer may be angled leftwards with respect to the painting direction.

In general, the spray jet is deformed in practice due to external forces (e.g. gravitational force, guide air, cabin air, electrostatic force, air stream due to the movement speed of the atomizer) in a certain deformation direction transversely with respect to the main axis of the spray jet, so that the resulting spray pattern on the component surface is stretched in the deformation direction and compressed opposite to the deformation direction. The spray jet is therefore preferably angled against the deformation direction to at least partially compensate for the asymmetry of the spray jet.

The angulation of the spray jet with respect to the surface normal of the component surface therefore reduces the stretching in the resulting spray pattern and the compression on the opposite side of the spray pattern, which leads to a uniform layer thickness distribution on the component surface.

In practice, several painting paths lying side by side and overlapping sidewards are applied onto the component surface such that the atomizer is moved respectively along the painting path over the component surface and thereby delivers the spray jet onto the component surface. Preferably, the atomizer is moved with the asymmetrical spray jet during application of the directly neighboring painting paths in the opposite painting direction along the painting path, so that the asymmetries of the spray jet cancel each other out as much as possible.

Alternatively, the spray jet may be angled in both opposite painting directions with respect to the surface normal of the component surface, so that the stretchings and compressions of the spray pattern in the opposite painting directions at least partially cancel each other out.

Yet further alternatively, the spray jet is, in contrast to the above description, angled only for a movement in one of two opposite painting directions with respect to the surface normal of the component surface. For the movement in the opposite painting direction, the spray jet is, in contrast, oriented with its main axis essentially parallel to the surface normal of the component surface, so that the stretchings or compressions of the spray pattern in the opposite painting directions are oriented at least in the same direction, which likewise leads to a uniform layer thickness distribution.

In a further example, at least two superimposed painting paths are sequentially applied onto the component surface, namely preferably wet-in-wet. In this case, it is advantageous that the atomizer is moved in another painting direction during application of the first painting path and during application of the second painting path, so that the asymmetries of the spray pattern in both painting paths at least partially compensate for each other, which leads to a more uniform layer thickness distribution.

The atomizer may be moved during application of both superimposed painting paths, respectively, along a meandrous movement path, in a known manner. Possibly, the meandrous movement path for the upper painting path may be mirrored with respect to the meandrous movement path for the lower painting path, wherein the mirror axis may run at a generally right angle to the painting path. In this case, the movement paths of the upper and the lower painting paths are traversed by the atomizer preferably in opposite directions. In another variant, the meandrous movement paths for the lower and the upper painting paths are, in contrast, essentially similar and are traversed only in opposite painting directions.

Practical trials have shown that it is advantageous, during application of superimposed painting paths, when the painting paths are applied in opposite painting directions, which leads to a more uniform layer thickness distribution.

As mentioned above, the asymmetry of the spray jet is caused by different forces. For example, this includes the following forces:

A downward oriented gravitational force,
an electrostatic force, which results from an electrostatic coating agent charging and acts between the electrostatically charged coating agent and the electrically grounded component or vice versa,
a first flow force, which is caused by a guide air jet that is delivered for shaping of the spray jet from the outside onto the spray jet,
a second flow force, which is caused by the fact that the atomizer is moved in the surrounding air along the component surface, and
a third flow force, which is generated by an air flow oriented downwards in a paint cabin.

The previously mentioned forces can vary during the operation of the atomizer, so that the resulting asymmetry of the spray jet can be subject to fluctuations in operation. It is therefore advantageous if the measures taken to compensate for the asymmetry of the spray jet are adapted accordingly during operation of the atomizer. For example, the forces, which cause the asymmetry of the spray jet, may therefore determined during the operation of the atomizer. The angulation of the atomizer with respect to the surface normal of the component surface can then be adapted depending on the determined forces in order to achieve a layer thickness distribution as uniform as possible. This adaptation can be done within the framework of a closed-loop control (i.e. with a feedback) or an open-loop control (i.e. without any feedback).

Further, the asymmetry of the spray jet increases with the disturbance variables (e.g. the pulling speed of the atomizer). Preferably, the angulation of the atomizer is therefore not constant during the operation, but is rather adapted with respect to the value (tilt angle) and/or the direction of the angulation accordingly, wherein the assignment between the disturbance variables and the associated optimal angulation of the atomizer can be done, for example, through a characteristic field.

Furthermore, the atomizer may be a rotary atomizer with a bell cup as the application element. However, other types of application devices that deliver a spray jet of the coating agent are possible in the context of the presently disclosed subject matter.

Further, the atomizer may be moved by a multi-axis painting robot with serial or parallel kinematics, as is known. Further, so-called rooftop machines or side machines can be used in the context of the present disclosure in as far as the atomizers can be angled as described above in order to compensate for the asymmetry of the spray jet.

Further, a coating device is disclosed.

BRIEF DESCRIPTION OF THE DRAWINGS

Other advantageous developments of the claimed invention are characterized in the subclaims or are explained in more detail below together with the description of the preferred exemplary embodiments of the invention on the basis of the figures. The figures show as follows:

DETAILED DESCRIPTION OF EXEMPLARY EMBODIMENTS

Figure 3A:
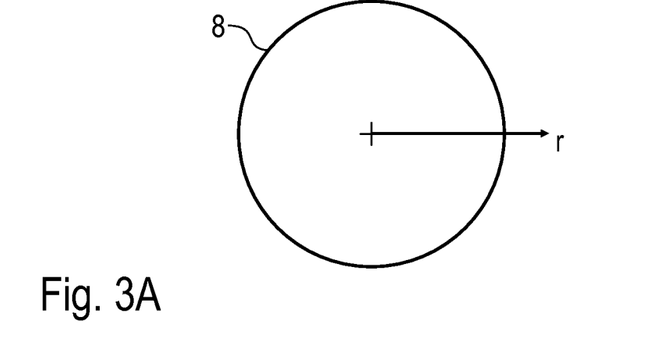
FIG. 3A: an idealized representation of a spray pattern that is created for a deformed, not rotationally symmetrical, spray jet when the asymmetry of the spray jet is compensated for, FIG. 3B: the layer thickness distribution, which results from compensation for the asymmetry of the spray jet.
Figure 3B:
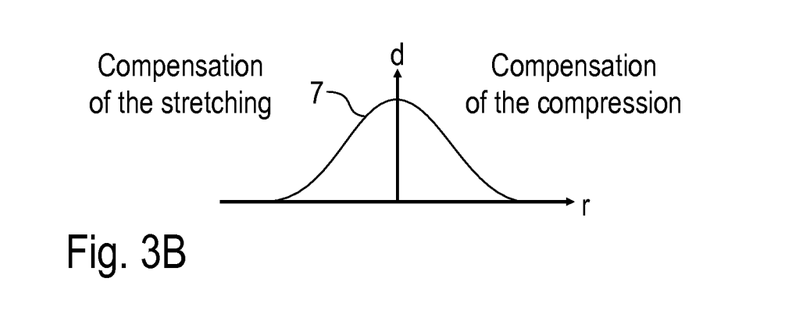
Figure 3C:
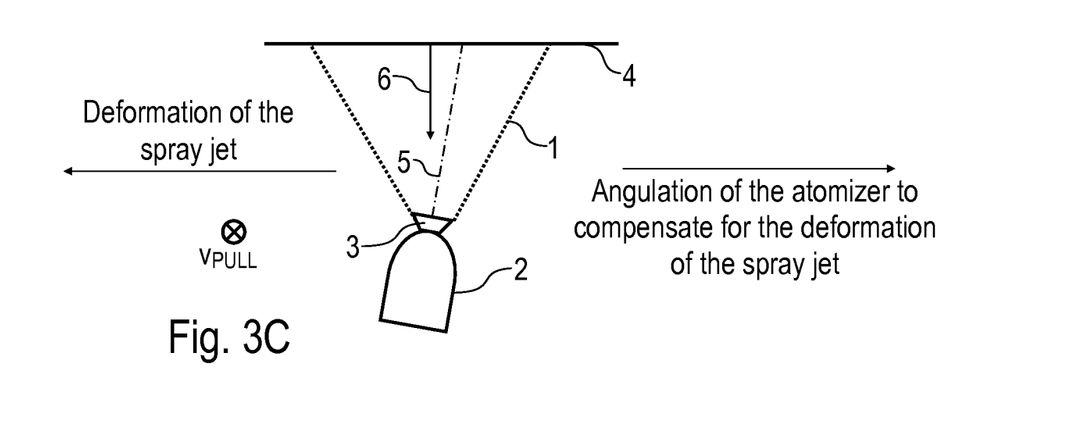
FIG. 3C: a rotary atomizer, which is angled with respect to the surface normal of the component surface to compensate for asymmetries of the spray jet.

Referring to FIGS. 3A to 3C, FIG. 3C shows the rotary atomizer 2 with the spray jet 1 deformed leftwards with respect to the main axis 5, as was already represented in FIG. 2C. For clarity, note that in FIGS. 3A-3C, a deformation to the left means that the spray jet 1 is deflected to the right with respect to the painting path on the component surface.

Accordingly, the rotary atomizer 2 is angled with the main axis 5 opposite to the deformation direction of the spray jet 1 with respect to the surface normal 6 of the component surface 4 so that a symmetrical layer thickness distribution 7 according to FIG. 3B, and the likewise symmetrical spray pattern 8 according to FIG. 3A, may result. The rotary atomizer 2 is thus angled rightwards in the drawing in order to compensate for the deformation of the spray jet 1 oriented leftwards in the drawing and caused by the disturbing forces (e.g. gravitational force, flow forces, etc.).

The rotary atomizer 2 is in this example guided by a multi-axis painting robot, which is not shown, and which accordingly angles the rotary atomizer 2. It should be emphasized that, in practice, neither the exactly rotationally symmetrical spray pattern 8 according to FIG. 3A nor the exactly rotationally symmetrical layer thickness distribution 7 according to FIG. 3B can be realized. The angulation in this example leads, however, to a clear reduction in the asymmetry of the spray pattern 8 and the layer thickness distribution 7.

Further, the angle between the main axis 5 of the rotary atomizer 2 and the surface normal 6 of the component surface 4 can be adapted continuously during operation of the atomizer 2 to achieve that the spray pattern 8 and the layer thickness distribution 7 are as symmetrical as possible. In the course of actual operation, the disturbance variables that deform the spray jet 1, and therefore contribute to the disturbing asymmetry of the spray jet 1, are thus measured. These fluctuating disturbance variables include, for example, the pulling speed of the rotary atomizer 2 relative to the component surface 4, the air sinking speed in the paint cabin, the electric voltage of the electrostatic coating agent charging as well as the guide air stream. These disturbance variables can then be used in conjunction with further known data (e.g. location and position of the painting robot, properties of the coating agent used, rotational speed of the rotary atomizer, etc.) to calculate the extent and the direction of the deformation of the spray jet 1. The direction and the angle of the angulation of the rotary atomizer 2 relative to the surface normal 6 of the component surface 4 are then calculated.

This adaptation of the direction and the angle of angulation of the rotary atomizer 2 with respect to the surface normal 6 of the component surface 4 can be controlled with an open-loop (i.e. without any feedback) or controlled with a closed-loop (i.e. with a feedback).

Figure 4A:
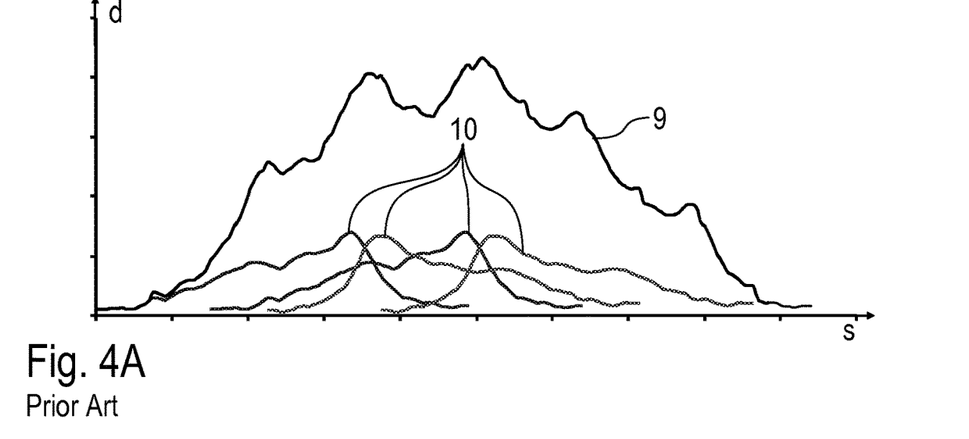
FIG. 4A: a layer thickness distribution for several painting paths lying side by side and overlapping laterally without any compensation for the asymmetry of the spray jet.
Figure 4B:
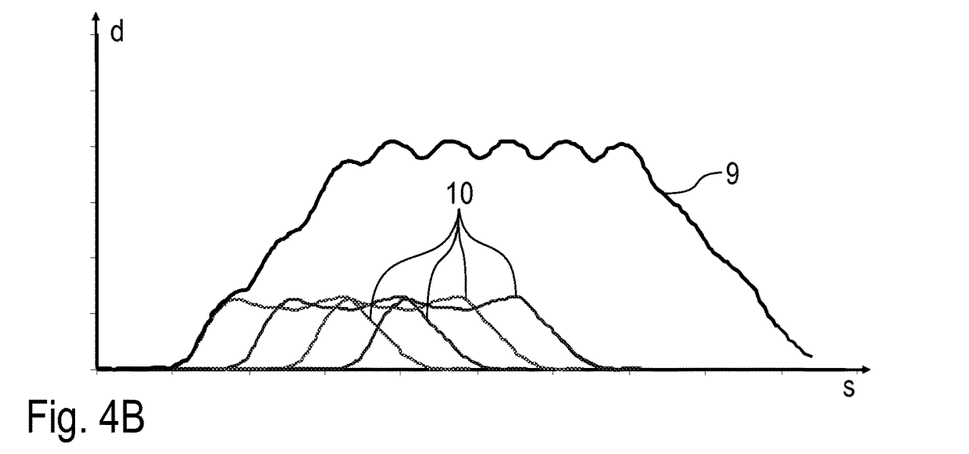
FIG. 4B: the layer thickness distribution of several painting paths lying side by side and overlapping laterally when the atomizer is angled on each painting path to compensate for the asymmetries of the spray jet.

With reference to the examples provided in FIGS. 4A and 4B, the rotary atomizer 2 applies several painting paths lying side by side and overlapping laterally onto the component surface 4, as is known. The individual painting paths have, respectively, an accordingly asymmetrical layer thickness distribution 10, due to the disturbing deformation of the spray jet 1 described above, as is apparent in the FIGS. 4B and 4C. The superimposition of the layer thickness distribution 10 of the individual painting paths then leads to the resulting layer thickness distribution 9.

For the example of FIG. 4B, the rotary atomizer 2 is angled on each of the painting paths to compensate for the asymmetry of the spray jet 1, i.e., in both directions of movement.

Figure 4C:
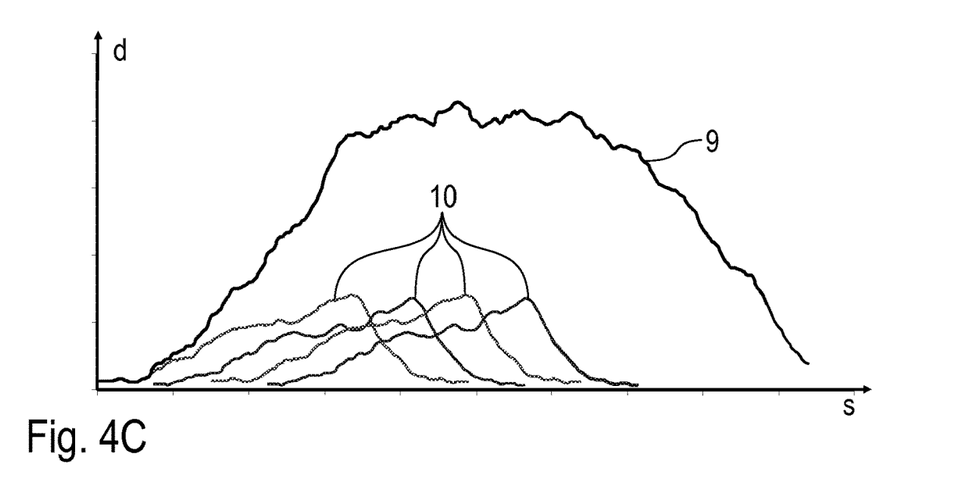
FIG. 4C: the layer thickness distribution for several painting paths lying side by side and overlapping laterally when either only the stretched or only the compressed side of the spray pattern is compensated for by an angulation of the atomizer.

For the example of FIG. 4C, the rotary atomizer 2 is angled on only one of the painting paths in order to compensate for the asymmetry of the spray jet 1.

In both cases, the comparison of the resulting layer thickness distribution 9 with the prior art according to 4A shows that the resulting layer thickness distribution 9 is considerably more uniform than without any compensation for the asymmetry of the spray jet 1.

Figure 5A:
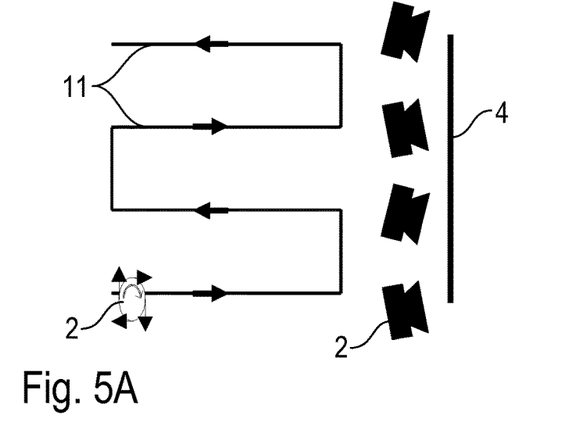
FIG. 5A: a meandrous movement path for application of several painting paths lying side by side and overlapping laterally as well as the corresponding angulation of the atomizer on the different painting paths.
Figure 5B:
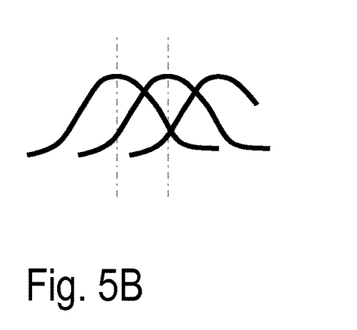
FIG. 5B: the resulting layer thickness distribution on the individual painting paths.
Figure 6A:
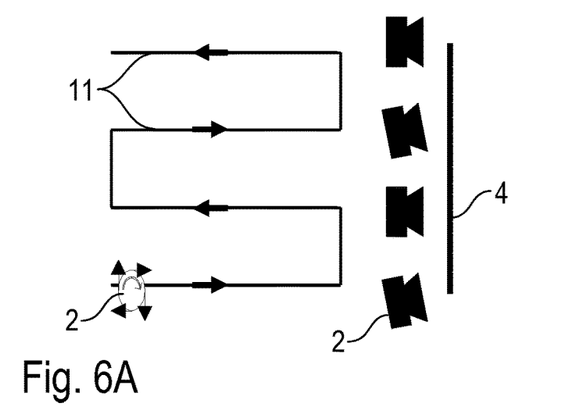
FIG. 6A: a meandrous movement path of the atomizer for application of several painting paths lying side by side and overlapping laterally and the corresponding angulation of the atomizer on the individual painting paths.
Figure 6B:
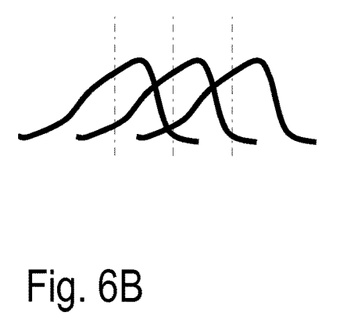
FIG. 6B: the resulting layer thickness distribution from FIG. 6A on the individual painting paths.
Figure 7A:
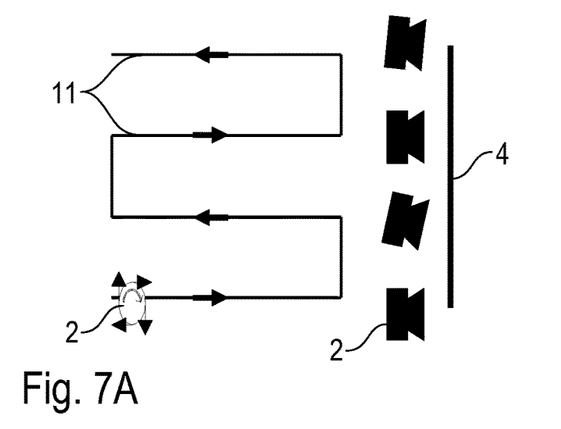
FIG. 7A: a meandrous movement path of the atomizer for application of several painting paths lying side by side and overlapping laterally as well as the corresponding angulation of the atomizer on the different painting paths.

The FIGS. 5A, 6A and 7A show a meandrous movement path 11 for the rotary atomizer 2, wherein the rotary atomizer 2 is guided along the meandrous movement path 11 over the component surface 4 in order to apply several painting paths lying side by side and overlapping laterally. The FIGS. 5B, 6B and 7B show the respective resulting layer thickness distribution on the individual painting paths.

For the variant according to FIGS. 5A and 5B, the rotary atomizer 2 is angled on each one of the painting paths in order to compensate for the asymmetry of the spray jet 1.

For the variant according to FIGS. 6A and 6B, the rotary atomizer 2 is, in contrast, angled only on the painting path, which runs from left to right in the drawing. For a painting direction from right to left, in contrast, there is in this variant no angulation of the rotary atomizer 2 to compensate for the asymmetry of the spray jet 1.

Figure 7B:
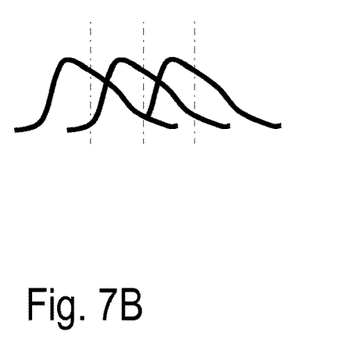
FIG. 7B: the resulting layer thickness distribution on the individual painting paths according to FIG. 7A, FIG. 8: a meandrous movement path of an atomizer for application of a first painting path onto the component surface.

For the variant according to FIGS. 7A and 7B, the rotary atomizer 2 is, in contrast, angled only for a painting direction from right to left in order to compensate for asymmetries of the spray jet 1.

The FIGS. 8 to 10B illustrate a further example in which two superimposed painting paths are applied sequentially onto the component surface 4, thus resulting in a multi-ply coating.

Figure 8:
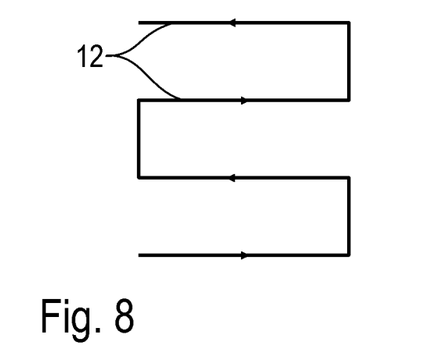

FIG. 8 shows a first application of a coating agent, wherein the rotary atomizer 2 is guided along a meandrous movement path 12 over the component surface 4 so that the spray jet 1 generates several painting paths lying side by side and overlapping laterally on the component surface 4.

Figure 9A:
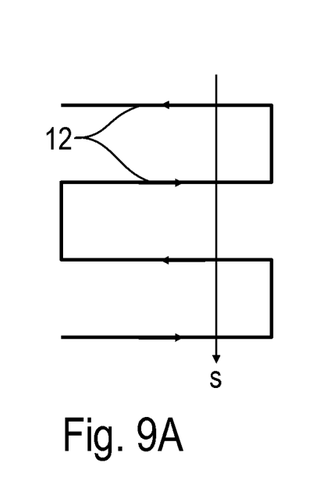
FIG. 9A: a meandrous movement path of the atomizer for application of a second painting path, wherein both painting paths are superimposed and are traversed in the same painting direction.

FIG. 9A shows a second application of a coating agent, which is performed wet-in-wet on the first layer of coating agent, wherein the rotary atomizer 2 is here likewise guided along the meandrous movement path 12 over the component surface 4. In this variant, the painting direction for the first coating agent according to FIG. 8 is the same as for the second coating agent according to FIG. 9A.

Figure 9B:
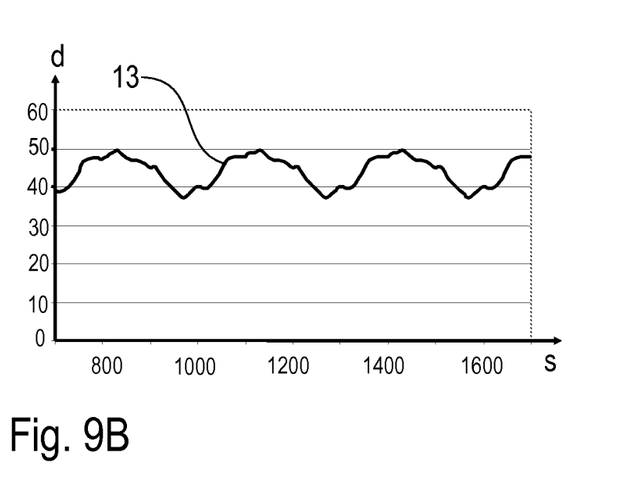
FIG. 9B: the resulting layer thickness distribution of the superimposed painting paths along the line s in FIG. 9A, FIG. 10A: a mirrored movement path as an alternative to the movement path according to FIG. 9A, wherein the superimposed painting paths are traversed in opposite painting directions.

Subsequently, there is a resulting layer thickness distribution 13, which is represented in FIG. 9B, wherein the drawing shows the layer thickness distribution 13 along the line s in FIG. 9A.

Figure 10A:
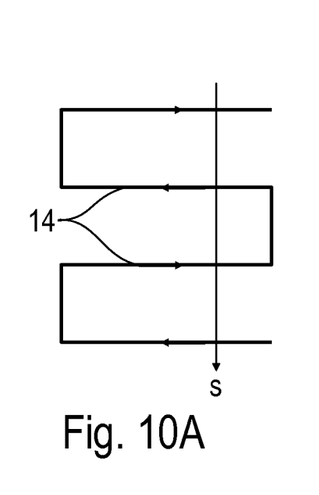
Figure 10B:
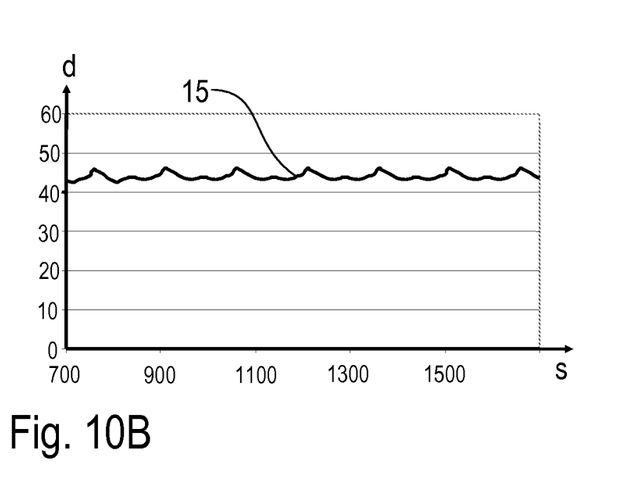
FIG. 10B: the resulting layer thickness distribution from the painting path according to FIG. 10A along the line s in FIG. 10A, FIG. 11: a simplified schematic representation of a coating device that compensates for asymmetries of the spray jet.

FIGS. 10A and 10B show an alternative for the second coating agent application that was described above with reference to the FIGS. 9A and 9B. In this example, the rotary atomizer 2 is guided during the second coating agent application process along a meandrous movement path 14 over the component surface 4, which results in a layer thickness distribution 15 represented in FIG. 10B.

The difference between the examples described above according to FIGS. 9A and 9B on the one hand, and FIGS. 10A and 10B on the other hand, consists in that the meandrous movement path 14 for the second coating agent application according to FIG. 10A is mirrored with respect to the meandrous movement path 12 for the first coating agent, namely about a mirror axis at right angle to the painting paths. On the other hand, the painting direction for the second coating agent application according to FIG. 10A is opposite to the painting direction for the first coating agent application according to FIG. 8.

A comparison of the FIGS. 9B and 10B shows that the second coating agent application with the mirrored movement path 14 and the opposite painting direction leads to a more uniform layer thickness distribution 15.

A similarly good layer thickness distribution can, however, also be obtained for a non-mirrored movement path for the second coating agent application, in as far as the painting direction for both coating agent applications is opposite.

Figure 11:
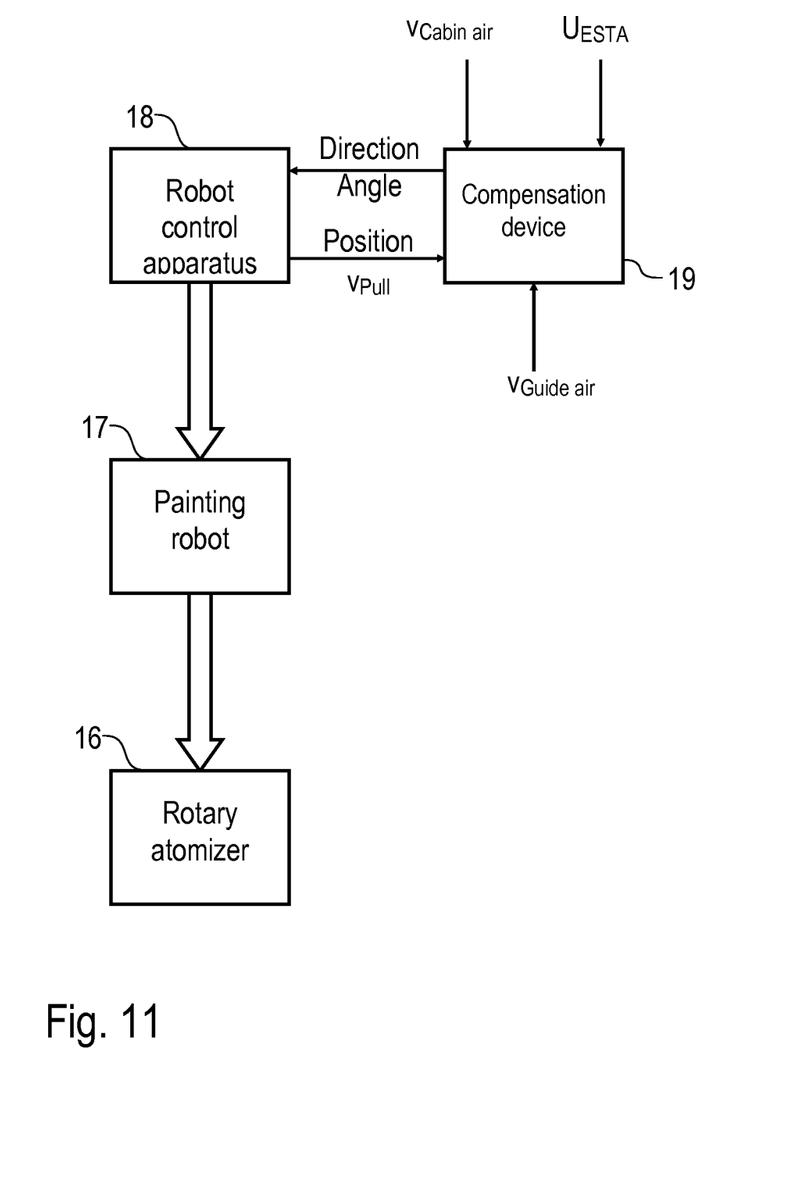

FIG. 11 shows simplified schematic of a coating device that can be used, for example, in a painting installation for painting motor vehicle body components.

Thus, the coating device has in this example a rotary atomizer 16, which is guided by a multi-axis painting robot 17 with a serial kinematics, wherein both the rotary atomizer 16 and also the painting robot 17 can in principle be designed in conventional manner and must therefore not be described in greater detail.

Furthermore, the coating device has a robot control apparatus 18, which has at first the conventional task of guiding the rotary atomizer 16 along a programmed movement path over the component surface.

In addition, the coating device has a compensation device 19, which has the task of compensating for the disturbing asymmetries of the spray jet 1 of the rotary atomizer 16.

For this purpose, the compensation device 19 receives as input values different disturbance variables, such as the movement speed $V_{Pull}$ of the rotary atomizer 16, a variable guide air speed $V_{Guide\ air}$, a variable cabin air sinking speed $V_{cabin\ air}$ and a variable electrostatic charging voltage $U_{ESTA}$. Furthermore, the compensation device 19 receives from the robot control apparatus 18 information about the location and position of the painting robot 17.

The compensation device 19 calculates therefrom the direction and the extent of the deformation of the spray jet 1 delivered by the rotary atomizer 16. Beyond this, the compensation device 19 then calculates the direction in which and at which angle the rotary atomizer 16 must be angled with respect to the surface normal 6 of the component surface 4 in order to compensate for the asymmetries of the spray jet 1 resulting from the disturbance variables. These data are then transmitted from the compensation device 19 to the robot control apparatus 18, which then always accordingly angles the rotary atomizer 16 in the course of actual operation.

The invention is not limited to the exemplary embodiments described above. Instead, many variants and modifications are possible, which also make use of the concept of the invention and thus fall within the scope of protection. It should furthermore be mentioned that the invention also claims protection for the subject matter and the features of the subclaims independently of the features of the claims to which they refer.

The invention claimed is:

1. A coating device for coating a component surface with a coating agent, comprising:

an atomizer configured to dispense a spray jet of a coating agent onto the component surface, such that the spray jet, when dispensed, has a main axis and an asymmetry with respect to the main axis, whereby the spray jet on the component surface generates a spray pattern with a corresponding asymmetry; the atomizer being operated with different disturbance variables includes a movement speed and a variable guide air speed; and a compensation device that receives as input values the disturbance variable and configured to at least partially compensate for the asymmetry of the spray jet, whereby the asymmetry of the spray pattern is reduced.

2. The coating device of claim 1, further comprising:

a manipulator to move the atomizer; and a control unit to control the manipulator;

wherein the control unit is configured to control the manipulator such that the atomizer is angled with respect to the surface normal of the component surface, whereby the spray jet hits with its main axis slanted with respect to the component surface.

3. The coating device of claim 2, wherein:

the control unit is configured to control the manipulator such that the atomizer is moved in a predetermined painting direction along the component surface to apply to the component surface an elongated painting path along the painting direction; and the control unit is configured to control the manipulator in a manner that the spray jet is angled with its main axis transverse to the painting direction, thereby at least partially compensating for the asymmetry of the spray jet.

4. The coating device of claim 2, wherein:

the device is configured to dispense the spray jet such that the spray jet is deformed in a deformation direction transverse with respect to the main axis of the spray jet, such that the resulting spray pattern on the component surface is stretched in the deformation direction and compressed against the deformation direction; and the control unit is configured to control the manipulator such that the atomizer is angled against the deformation direction to at least partially compensate for the asymmetry of the spray jet.

5. The coating device of claim 2, wherein the manipulator is a multi-axis painting robot.

6. The coating device of claim 2, wherein the manipulator is a painting machine.

7. The coating device of claim 2 wherein the compensation device calculates an extent of the deformation of the spray jet.

8. The coating device of claim 7 wherein the spray jet compensation device calculates an angle which the atomizer must be angled with respect to the component surface in order to compensate for the asymmetries of the spray jet.

* * * * *